US009768639B2

(12) United States Patent
Nakazawa et al.

(10) Patent No.: US 9,768,639 B2
(45) Date of Patent: Sep. 19, 2017

(54) VEHICLE-MOUNTED POWER SOURCE DEVICE

(71) Applicant: Panasonic Intellectual Property Management Co., Ltd., Osaka (JP)

(72) Inventors: Takashi Nakazawa, Hyogo (JP); Takashi Kitahara, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 77 days.

(21) Appl. No.: 14/437,383

(22) PCT Filed: Oct. 22, 2013

(86) PCT No.: PCT/JP2013/006248
§ 371 (c)(1),
(2) Date: Apr. 21, 2015

(87) PCT Pub. No.: WO2014/076884
PCT Pub. Date: May 22, 2014

(65) Prior Publication Data
US 2015/0280487 A1    Oct. 1, 2015

(30) Foreign Application Priority Data

Nov. 16, 2012    (JP) .................................. 2012-251755

(51) Int. Cl.
*H02J 7/35*        (2006.01)
*H01M 10/44*    (2006.01)
(Continued)

(52) U.S. Cl.
CPC ................ *H02J 7/35* (2013.01); *B60K 16/00* (2013.01); *B60L 3/0046* (2013.01); *B60L 8/003* (2013.01);
(Continued)

(58) Field of Classification Search
CPC ......................................................... H02J 7/35
(Continued)

(56) References Cited

U.S. PATENT DOCUMENTS 8,378,623 B2 *   2/2013   Kusch ................... B60L 11/005
                                                                        320/104
2005/0029867 A1 *   2/2005   Wood ........................ H02J 1/08
                                                                        307/10.1
(Continued)

FOREIGN PATENT DOCUMENTS

JP    10-309002 A    11/1998
JP    2011-501013 A    1/2011
(Continued)

OTHER PUBLICATIONS

Supplemental European Search Report for Application No. 13855038.9-1657/2921336 PCT/JP2013006248.
(Continued)

*Primary Examiner* — Edward Tso
*Assistant Examiner* — Jerry D Robbins
(74) *Attorney, Agent, or Firm* — Pearne & Gordon, LLP

(57) ABSTRACT

The vehicle-mounted power source device comprising: a low-voltage battery; a high-voltage battery; a boost unit that boosts electrical power for charging the high-voltage battery; a solar panel that converts solar light to electrical power; a bi-directional buck-boost unit that boosts/bucks the electrical power converted by the solar panel; and a control unit that performs control in a manner so as to charge the low-voltage battery by means of electrical power of which the voltage has been altered by the buck-boost unit. When the amount of stored electrical power at the low-voltage battery is at least a predetermined value, the control unit performs control in a manner so that the electrical power stored at the low-voltage battery is boosted by the boost unit
(Continued)

and the bi-directional buck-boost unit, and the high-voltage battery is charged by means of the boosted electrical power.

4 Claims, 2 Drawing Sheets

(51) Int. Cl.
| | |
|---|---|
| *B60K 16/00* | (2006.01) |
| *B60L 3/00* | (2006.01) |
| *B60L 8/00* | (2006.01) |
| *B60L 11/00* | (2006.01) |
| *B60L 11/18* | (2006.01) |
| *H02J 7/00* | (2006.01) |
| *H01M 10/0525* | (2010.01) |
| *H01M 10/06* | (2006.01) |

(52) U.S. Cl.
CPC ......... *B60L 11/005* (2013.01); *B60L 11/1861* (2013.01); *B60L 11/1868* (2013.01); *H01M 10/44* (2013.01); *H02J 7/0052* (2013.01); *B60K 2016/003* (2013.01); *B60L 2210/12* (2013.01); *B60L 2210/14* (2013.01); *B60L 2240/547* (2013.01); *B60L 2240/549* (2013.01); *H01M 10/0525* (2013.01); *H01M 10/06* (2013.01); *H01M 2220/20* (2013.01); *Y02E 60/122* (2013.01); *Y02E 60/126* (2013.01); *Y02T 10/7011* (2013.01); *Y02T 10/7016* (2013.01); *Y02T 10/7022* (2013.01); *Y02T 10/7044* (2013.01); *Y02T 10/7066* (2013.01); *Y02T 10/7083* (2013.01); *Y02T 10/7225* (2013.01); *Y02T 10/7233* (2013.01); *Y02T 10/90* (2013.01)

(58) Field of Classification Search
USPC ........................................................ 320/101
See application file for complete search history.

(56) References Cited

U.S. PATENT DOCUMENTS

| | | |
|---|---|---|
| 2010/0213887 A1 | 8/2010 | Louch et al. |
| 2012/0098480 A1* | 4/2012 | David .................... B60L 8/003 320/101 |
| 2012/0112684 A1 | 5/2012 | Xu et al. |
| 2012/0133322 A1* | 5/2012 | Walsh ...................... B60L 8/00 320/101 |
| 2012/0286052 A1 | 11/2012 | Atluri et al. |
| 2013/0106342 A1* | 5/2013 | Iwata ....................... H02M 7/30 320/101 |
| 2013/0169210 A1 | 7/2013 | Louch et al. |
| 2014/0159478 A1 | 6/2014 | Ang |

FOREIGN PATENT DOCUMENTS

| | | |
|---|---|---|
| JP | 2013-074733 A | 4/2013 |
| JP | 2013/099069 A | 5/2013 |
| WO | 2013/030941 A1 | 3/2013 |

OTHER PUBLICATIONS

International Search Report for Application No. PCT/JP2013/006248 dated Jan. 14, 2014.

* cited by examiner

VEHICLE-MOUNTED POWER SOURCE DEVICE

TECHNICAL FIELD

The present invention relates to a vehicle-mounted power source apparatus that charges a battery with electrical power obtained by solar power generation.

BACKGROUND ART

In recent years, there has been an increasing demand for a long cruising distance and a short charging time of a high voltage battery in a vehicle that runs on a high voltage battery as a power source, such as an electric automobile. In this respect, the high voltage battery for driving a vehicle may be charged with electrical power obtained by solar power generation.

When the high voltage battery is charged with the electrical power obtained by solar power generation, a boost DC-DC converter and a relay to boost the voltage of the electrical power to a high voltage need to be driven, however. Thus, when good sunlight is not available, the power consumption for driving a boost DC-DC converter or the like becomes greater than the electrical power obtained by solar power generation. As a result, there is a concern that the high voltage battery may not be charged.

In Patent Literature (hereinafter, referred to as "PTL") 1, a configuration is employed in which an electric double-layer capacitor is charged with the electrical power generated by a solar cell, and a charger operation command signal is output to a charger to re-charge a battery with the electrical power in the electric double-layer capacitor when a terminal voltage of the electric double-layer capacitor exceeds a breakdown voltage of a Zener diode. Accordingly, since the charger is in a non-operation state when the terminal voltage is equal to or lower than the breakdown voltage of the Zener diode, it is possible to limit the power consumption in a circuit to the minimum, and to efficiently use energy.

CITATION LIST

Patent Literature

PTL 1
Japanese Patent Application Laid-Open No. 10-309002

SUMMARY OF INVENTION

Technical Problem

However, in a case where the high voltage battery is charged with boosted electrical power after a low voltage battery (the electric double-layer capacitor in PTL 1) is charged, and when a voltage difference between the low voltage battery and the high voltage battery is large, the efficiency of the boost DC-DC converter deteriorates. That is, there arises a problem in that it is not possible to efficiently charge the high voltage battery with electrical power obtained by solar power generation.

An object of the present invention is to provide a vehicle-mounted power source apparatus that prevents a decrease in the charge efficiency thereof by using a plurality of boost DC-DC converters when charging a high voltage battery with electrical power obtained by solar power generation.

Solution to Problem

A vehicle-mounted power source apparatus according to the present invention is an apparatus that charges a battery with electrical power obtained by solar power generation, the apparatus including: a low voltage battery; a high voltage battery that stores electrical power having a voltage higher than the low voltage battery; a boost section that boosts the voltage of the electrical power for charging the high voltage battery; a solar panel that converts sunlight into electrical power; a bidirectional buck-boost section that boosts or steps down the voltage of the electrical power obtained through the conversion by the solar panel; and a control section that makes a control so as to charge the low voltage battery with the electrical power transformed by the bidirectional buck-boost section, in which, when the amount of electrical power stored in the low voltage battery is equal to or greater than a predetermined value, the control section makes a control so as to boost the electrical power stored in the low voltage battery, by the bidirectional buck-boost section and the boost section and to charge the high voltage battery with the boosted electrical power.

Advantageous Effects of Invention

According to the present invention, it is possible to prevent a decrease in the charge efficiency of the apparatus by using a plurality of the boost DC-DC converters when charging the high voltage battery with electrical power obtained by solar power generation.

DESCRIPTION OF EMBODIMENTS

Hereinafter, an embodiment of the present invention will be described in detail with reference to the accompanying drawings.

Embodiment 1

[Configuration of Vehicle-Mounted Power Source Apparatus]

Figure 1:
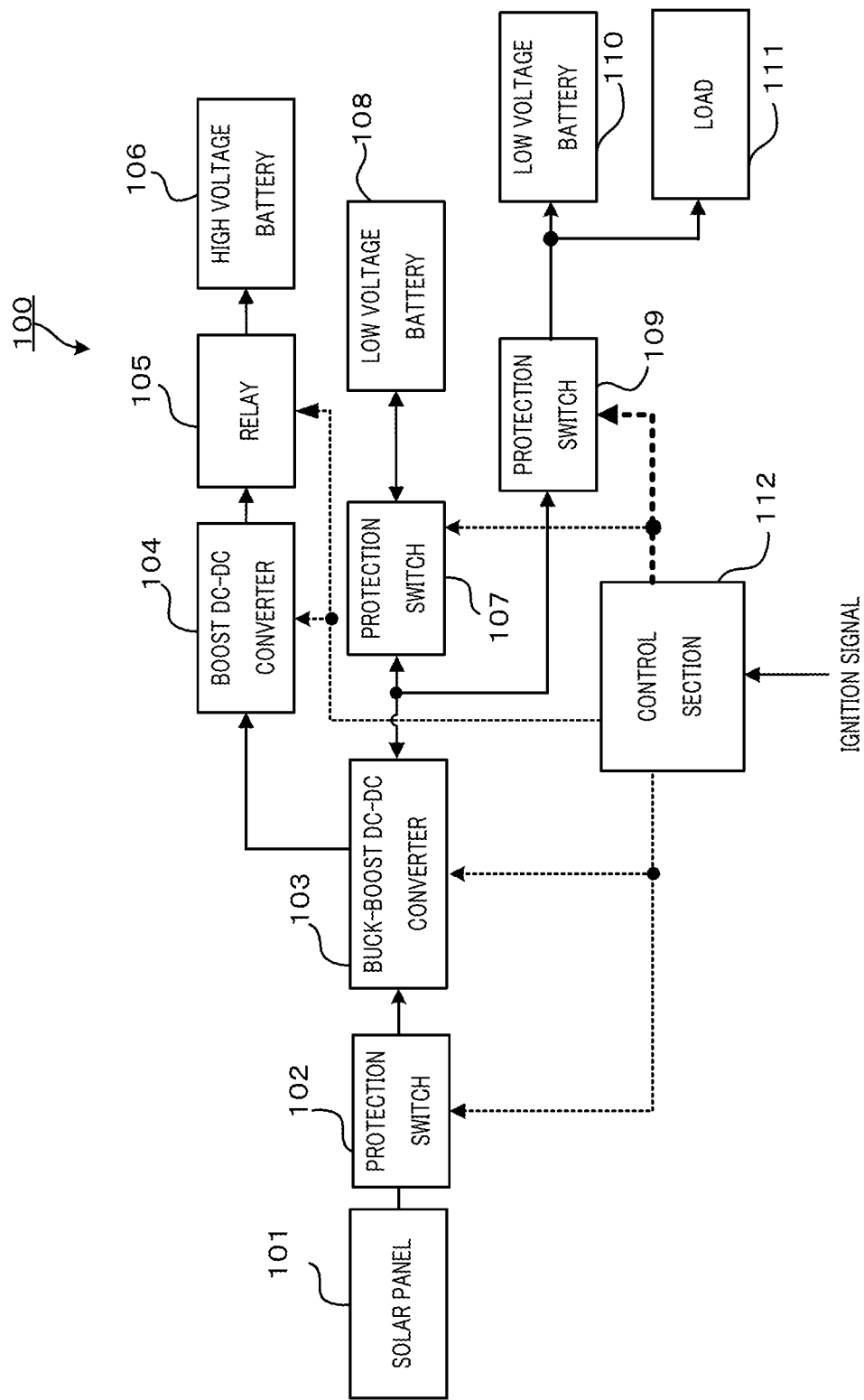
FIG. 1 is a block diagram illustrating the configuration of a vehicle-mounted power source apparatus according to Embodiment 1 of the present invention.

The configuration of vehicle-mounted power source apparatus 100 according to Embodiment 1 of the present invention will be described with reference to FIG. 1. In regard to input and output lines in FIG. 1, dotted lines each indicate an input and output line for the transmission of a control signal, and solid lines each indicate an input and output line for the delivery of electrical power.

Vehicle-mounted power source apparatus 100 mainly includes solar panel 101; protection switch 102; buck-boost DC-DC converter 103; boost DC-DC converter 104; relay 105; high voltage battery 106; protection switch 107; low voltage battery 108; protection switch 109; low voltage battery 110; load 111; and control section 112.

Solar panel 101 converts received sunlight into electrical power, and outputs the electrical power to buck-boost DC-DC converter 103 via protection switch 102.

Protection switch 102 switches between ON and OFF states according to the control by control section 112. When protection switch 102 is turned on, the electrical power from solar panel 101 is output to buck-boost DC-DC converter 103, and in contrast, when protection switch 102 is turned off, the electrical power from solar panel 101 is not output to buck-boost DC-DC converter 103.

Buck-boost DC-DC converter 103 outputs electrical power with a desired voltage by boosting and stepping down the electrical power that is input from solar panel 101 via protection switch 102, according to the control by control section 112. Buck-boost DC-DC converter 103 outputs the transformed electrical power to protection switch 107 and protection switch 109.

In the embodiment, buck-boost DC-DC converter 103 is a bidirectional buck-boost DC-DC converter. That is, buck-boost DC-DC converter 103 can boost or step down the electrical power that is input from solar panel 101 via protection switch 102, and can boost electrical power that is input from low voltage battery 108 via protection switch 107. The electrical power (the electrical power from low voltage battery 108) boosted by buck-boost DC-DC converter 103 is output to boost DC-DC converter 104.

Boost DC-DC converter 104 boosts the voltage of the electrical power from buck-boost DC-DC converter 103 to a predetermined value (for example, 50V to 400V) according to the control by control section 112, and outputs the boosted electrical power to relay 105.

At this time, a loss occurs in the electrical power boosted by buck-boost DC-DC converter 103 or boost DC-DC converter 104. It is known that this loss increases as the degree of boost increases. For example, an electrical power loss associated with boosting further increases when a voltage is boosted by forty times from 10V to 400V compared to when a voltage is boosted by five times from 40V to 200V.

For this reason, in the embodiment, boosting is performed using two boost DC-DC converters such as buck-boost DC-DC converter 103 and boost DC-DC converter 104, and thereby an electrical power loss associated with the boosting decreases. That is, when a voltage is boosted by forty times from 10V to 400V, buck-boost DC-DC converter 103 boosts a voltage by five times from 10V to 50V, and boost DC-DC converter 104 boosts a voltage by eight times from 50V to 400V, and thereby it is possible to boost a voltage to a desired voltage value (400V) while preventing a single buck-boost DC-DC converter from performing a high boost operation. Accordingly, it is possible to decrease an electrical power loss associated with boosting, and to prevent a decrease in charge efficiency.

Relay 105 switches between ON and OFF states according to the control by control section 112. When relay 105 is turned on, the electrical power from boost DC-DC converter 104 is output to high voltage battery 106, and in contrast, when relay 105 is turned off, the electrical power from boost DC-DC converter 104 is not output to high voltage battery 106.

High voltage battery 106 stores the high-voltage electrical power that is input from boost DC-DC converter 104 via relay 105. For example, high voltage battery 106 is a lithium-ion cell (400V), and is used as a power source for driving a vehicle equipped with vehicle-mounted power source apparatus 100.

Protection switch 107 switches between ON and OFF states according to the control by control section 112. When protection switch 107 is turned on, the electrical power from buck-boost DC-DC converter 103 is output to low voltage battery 108, and in contrast, when protection switch 107 is turned off, the electrical power from buck-boost DC-DC converter 103 is not output to low voltage battery 108. When high voltage battery 106 is charged with electrical power stored in low voltage battery 108, protection switch 107 is set to be turned on, and thereby the electrical power from low voltage battery 108 is output to buck-boost DC-DC converter 103.

Low voltage battery 108 stores the low-voltage electrical power that is input from buck-boost DC-DC converter 103 via protection switch 107. For example, low voltage battery 108 is a lead-acid battery (10V).

Protection switch 109 switches between ON and OFF states according to the control by control section 112. When protection switch 109 is turned on, the electrical power from buck-boost DC-DC converter 103 is output to low voltage battery 110 and load 111, and in contrast, when protection switch 109 is turned off, the electrical power from buck-boost DC-DC converter 103 is not output to low voltage battery 110 and load 111.

Low voltage battery 110 stores the low-voltage electrical power that is input from buck-boost DC-DC converter 103 via protection switch 109. For example, low voltage battery 110 is a lead-acid battery (12V), and is used as a power source for load 111.

Load 111 operates on the electrical power from protection switch 109 or electrical power stored in low voltage battery 110. For example, load 111 is an accessory for the vehicle such as a car navigation system.

Control section 112 controls buck-boost DC-DC converter 103 to switch between the turning on and off of a boost operation or a step down operation, and controls a boost operation of boost DC-DC converter 104, an operation of protection switches 102, 107, and 109, and an operation of relay 105. Control section 112 monitors the amount of electrical power stored in low voltage battery 108, the amount of electrical power stored in high voltage battery 106, and the amount of electrical power stored in low voltage battery 110. Control section 112 charges low voltage battery 108, based on a monitoring result, and when the amount of electrical power stored in low voltage battery 108 is equal to or greater than a predetermined value, control section 112 controls protection switch 102, buck-boost DC-DC converter 103, boost DC-DC converter 104, relay 105, and protection switch 107 so that high voltage battery 106 is charged.

That is, first, control section 112 controls boost DC-DC converter 104 to be turned off, protection switch 107 to be turned on, and protection switch 109 to be turned off so that the low voltage battery 108 is charged without boosting the voltage of electrical power from solar panel 101 via boost DC-DC converter 104.

When the amount of electrical power stored in low voltage battery 108 is equal to or greater than the predetermined value, control section 112 controls protection switch 102 to be turned off, and buck-boost DC-DC converter 103, boost DC-DC converter 104, relay 105, and protection switch 107 to be turned on so that the high voltage battery 106 is charged with electrical power stored in the low voltage battery 108.

When high voltage battery 106 is charged with electrical power stored in low voltage battery 108, it is possible to boost the voltage of the electrical power stored in low voltage battery 108 via buck-boost DC-DC converter 103 and boost DC-DC converter 104, and thereby it is possible to boost the voltage to a voltage value required by the high voltage battery in multiple stages.

Accordingly, in vehicle-mounted power source apparatus 100, it is possible to decrease a loss when the voltage of electrical power stored in low voltage battery 108 is boosted to the voltage value required by the high voltage battery.

In addition, since buck-boost DC-DC converter 103 for adjusting the voltage of electrical power from solar panel 101 is used so as to boost the voltage of electrical power stored in low voltage battery 108, it is not necessary to provide a separate boost DC-DC converter.

Here, the charging of low voltage battery 108 implies that low voltage battery 108 stores electrical power until the amount of electrical power stored therein reaches a predetermined value.

Control section 112 can determine whether the vehicle is travelling or is stopped, based on an ignition signal from the outside. For example, when an ignition signal indicates that the vehicle is driven, control section 112 determines that the vehicle is travelling. When an ignition signal indicates that the vehicle is stopped, control section 112 determines that the vehicle is stopped.

[Operation of Vehicle-Mounted Power Source Apparatus]

Figure 2:
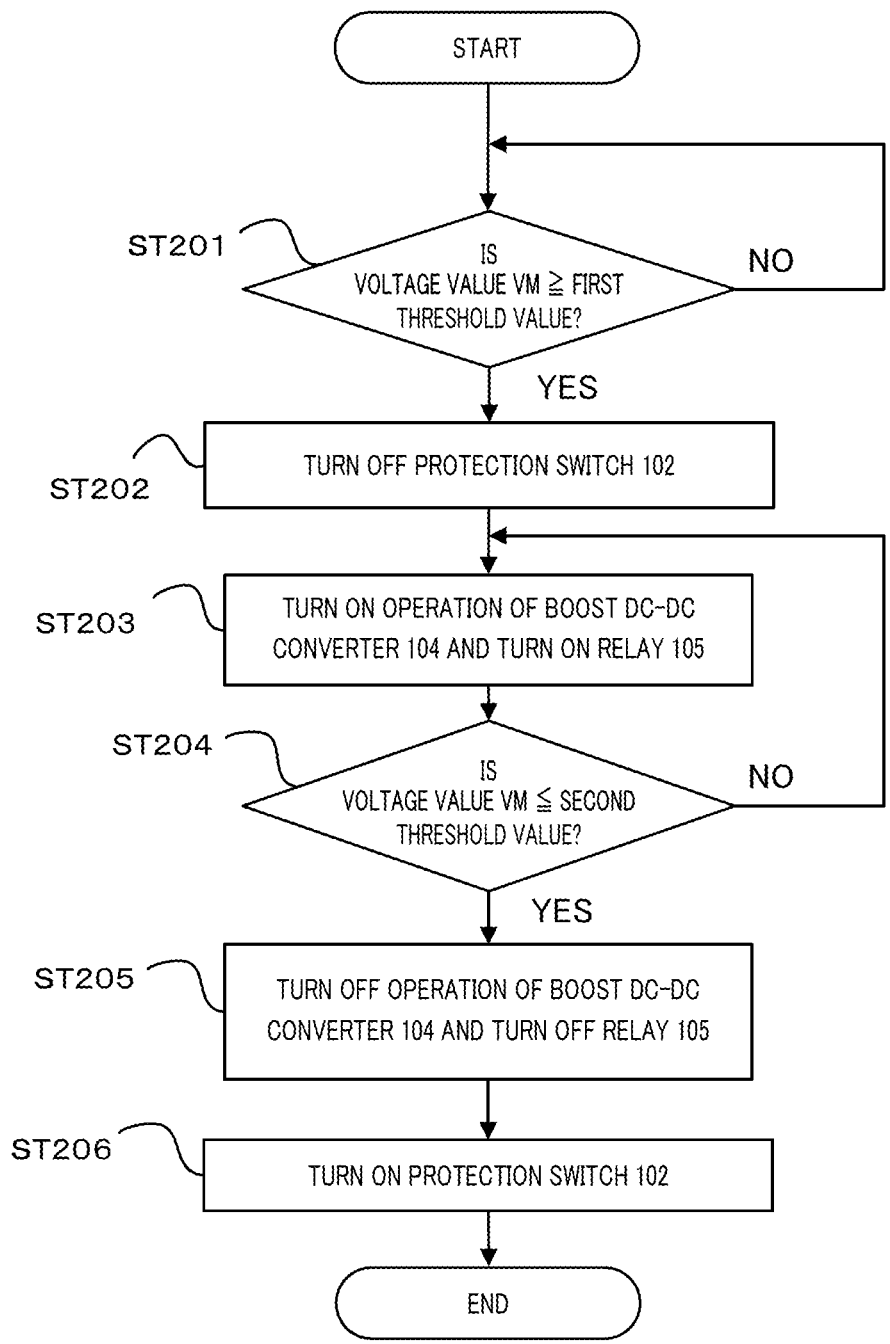
FIG. 2 is a flowchart illustrating an operation of the vehicle-mounted power source apparatus according to Embodiment 1 of the present invention.

An operation of vehicle-mounted power source apparatus 100 according to Embodiment 1 of the present invention will be described with reference to the flowchart illustrated in FIG. 2. A description of this flowchart will be given based on the assumption that protection switches 102 and 107 are turned on, and protection switch 109, boost DC-DC converter 104, and relay 105 are turned off (that is, electrical power from solar panel 101 is charged to low voltage battery 108 via protection switch 102, buck-boost DC-DC converter 103, and protection switch 107).

First, control section 112 determines whether a voltage value VM of low voltage battery 108 is equal to or greater than a first threshold value (step ST201). Here, the voltage value VM indicates the amount of electrical power stored in low voltage battery 108, and increases as the amount of stored electrical power is large. The first threshold value is the amount of electrical power (for example, an upper limit value for the amount of electrical power stored in low voltage battery 108) suitable for charging high voltage battery 106, and is a reference value to determine as to whether or not to stop charging low voltage battery 108.

When control section 112 determines that the voltage value VM is less than the first threshold value (step ST201: NO), the process returns to step ST201. Accordingly, vehicle-mounted power source apparatus 100 continuously charges low voltage battery 108 until the voltage value VM becomes equal to or greater than the first threshold value.

In contrast, when control section 112 determines that the voltage value VM is equal to or greater than the first threshold value (step ST201: YES), control section 112 turns off protection switch 102 (step ST202). Accordingly, vehicle-mounted power source apparatus 100 stops the feeding of electrical power from solar panel 101 to buck-boost DC-DC converter 103.

Subsequently, control section 112 turns on boost DC-DC converter 104 and relay 105 (step ST203). Accordingly, vehicle-mounted power source apparatus 100 starts to discharge low voltage battery 108 and to charge high voltage battery 106.

Specifically, for example, when low voltage battery 108 is a 10V battery, and high voltage battery 106 is a 400V battery, the control section 112 charges high voltage battery 106 by controlling buck-boost DC-DC converter 103 to boost electrical power by five times from 10V to 50V, the electrical power being input from low voltage battery 108 via protection switch 107, and controlling boost DC-DC converter 104 to boost the boosted electrical power by eight times from 50V to 400V. A boost ratio between buck-boost DC-DC converter 103 and boost DC-DC converter 104 is preferably set to a value at which an electrical power loss is minimized.

Subsequently, control section 112 determines whether the voltage value VM is a second threshold value (the first threshold value>the second threshold value) or less (step ST204). Here, the second threshold value indicates the amount of electrical power (a lower limit value for the amount of electrical power stored in low voltage battery 108) suitable for confirming completion of the charging of high voltage battery 106, and is a reference value to determine as to whether or not to stop discharging low voltage battery 108, and a reference value to determine as to whether or not to stop charging high voltage battery 106.

When control section 112 determines that the voltage value VM is greater than the second threshold value (step ST204: NO), the process returns to step ST203. Accordingly, vehicle-mounted power source apparatus 100 continues to discharge low voltage battery 108 and to charge high voltage battery 106.

In contrast, when control section 112 determines that the voltage value VM is the second threshold value or less (step ST204: YES), control section 112 turns off boost DC-DC converter 104 and relay 105 (step ST205). Accordingly, vehicle-mounted power source apparatus 100 stops the discharging of low voltage battery 108, and stops the charging of high voltage battery 106.

Subsequently, control section 112 turns on protection switch 102 (step ST206), and charges low voltage battery 108 (process returns to step ST201).

[Effects of Embodiment 1]

In the embodiment, when electrical power from solar panel 101 is stored in low voltage battery 108, and electrical power stored in low voltage battery 108 becomes equal to or greater than the predetermined value, high voltage battery 106 is charged with the electrical power stored in low voltage battery 108, and thereby it is possible to prevent a decrease in charge efficiency compared to when electrical power from solar panel 101 is boosted and high voltage battery 106 is charged with the boosted electrical power.

In the embodiment, the two boost DC-DC converters such as buck-boost DC-DC converter 103 and boost DC-DC converter 104 boost a voltage value of the electrical power stored in low voltage battery 108 up to a voltage value suitable for charging high voltage battery 106.

For this reason, even when there is a large voltage difference present between the voltage value of the electrical power stored in low voltage battery 108 and the voltage value suitable for charging high voltage battery 106, it is possible to decrease an electrical power loss associated with boosting, and to prevent a decrease in charge efficiency.

Since buck-boost DC-DC converter 103 is a bidirectional boost DC-DC converter, buck-boost DC-DC converter 103 for adjusting the voltage of electrical power from solar panel 101 can be used so as to boost the voltage of electrical power stored in low voltage battery 108, and it is also possible to reduce costs without providing a separate boost DC-DC converter for multiple stage boosting.

[Variation of Embodiment 1]

In this embodiment, control section 112 determines whether a voltage value VH of high voltage battery 106 is equal to or greater than a third threshold value, and when the voltage value VH is equal to or greater than the third threshold value, control section 112 may stop the charging of high voltage battery 106 and low voltage battery 108 (that is, turning off boost DC-DC converter 104 and protection switch 107), and supply electrical power from solar panel 101 to low voltage battery 110 and load 111 (that is, turning on protection switch 109).

Here, the voltage value VH indicates the amount of electrical power stored in high voltage battery 106, and increases as the amount of stored electrical power increases. The third threshold value is an upper limit value for the amount of electrical power stored in high voltage battery 106, and is a reference value to determine as to whether or not to stop charging high voltage battery 106.

Since the charging of high voltage battery 106 stops when the amount of electrical power stored in high voltage battery 106 reaches the upper limit value, it is possible to prevent high voltage battery 106 from being overcharged, and to efficiently use electrical power from solar panel 101 without waste.

As described above, when the amount of electrical power stored in high voltage battery 106 reaches the upper limit value, electrical power from solar panel 101 may be supplied to low voltage battery 110 and load 111. Instead of that, first, electrical power from solar panel 101 may be supplied to low voltage battery 110 and load 111, and when the voltage value VL of low voltage battery 110 reaches the upper limit value for the amount of electrical power stored in low voltage battery 110, the charging of high voltage battery 106 (low voltage battery 108) may be started.

Accordingly, low voltage battery 110 not requiring the boosting of the electrical power (having a small electrical power loss associated with boosting) is preferentially charged, and thereby it is possible to further decrease an electrical power loss associated with boosting, and to prevent a decrease in charge efficiency.

The prioritization for charging low voltage battery 110 and high voltage battery 106 (low voltage battery 108) may be determined based on whether the vehicle equipped with vehicle-mounted power source apparatus 100 is travelling or stopped. For example, when the vehicle is travelling, high voltage battery 106 (low voltage battery 108) is preferentially charged, and in contrast, when the vehicle is stopped, low voltage battery 110 is preferentially charged.

That is, since high voltage battery 106 is charged when the vehicle is stopped, it is necessary to turn on relay 105 and to start up the peripheral devices for charging, and electrical power is consumed; however, since relay 105 has already been turned on, and the peripheral devices have already been started up when the vehicle is travelling, it is possible to prevent a decrease in charge efficiency when high voltage battery 106 is charged while the vehicle is travelling compared to when high voltage battery 106 is charged while the vehicle is stopped.

For this reason, when the vehicle is travelling, high voltage battery 106 may be preferentially charged.

In contrast, since it is possible to prevent load 111 from consuming electrical power from low voltage battery 110 when electrical power is supplied to low voltage battery 110 and load 111 while the vehicle is travelling compared to when low voltage battery 110 is charged while the vehicle is stopped, low voltage battery 110 and load 111 may be preferentially charged while the vehicle is travelling.

In the embodiments, buck-boost DC-DC converter 103 is preferably a maximum power point tracking (MPPT) apparatus.

Accordingly, even when the vehicle equipped with vehicle-mounted power source apparatus 100 is partially shaded while travelling, it is possible to charge low voltage battery 108 and the like with the maximum electrical power amount from solar panel 101.

The disclosure of Japanese Patent Application No. 2012-251755, filed on Nov. 16, 2012, including the specification, drawings and abstract is incorporated herein by reference in its entirety.

INDUSTRIAL APPLICABILITY

The vehicle-mounted power source apparatus is suitable for storing electrical power obtained by solar power generation in the batteries.

REFERENCE SIGNS LIST

100 vehicle-mounted power source apparatus
101 solar panel
102 protection switch
103 buck-boost DC-DC converter
104 boost DC-DC converter
105 relay
106 high voltage battery
107 protection switch
108 low voltage battery
109 protection switch
110 low voltage battery
111 load
112 control section

The invention claimed is:

1. A vehicle-mounted power source apparatus that charges a battery with electrical power obtained by solar power generation, the apparatus comprising:
   a solar panel that converts sunlight into electrical power;
   a bidirectional buck-boost section that boosts or steps down the voltage of the electrical power obtained through the conversion by the solar panel;
   a low voltage battery;
   a control section that makes a control so as to charge the low voltage battery with the electrical power transformed by the bidirectional buck-boost section;
   a high voltage battery that stores electrical power having a voltage higher than the low voltage battery; and
   a boost section that boosts the voltage of the electrical power stored in the low voltage battery for charging the high voltage battery, wherein,
   when the amount of the electrical power stored in the low voltage battery is equal to or greater than a predetermined value, the control section makes a control so as to boost the electrical power stored in the low voltage battery, first by the bidirectional buck-boost section that boosts or steps down the voltage of the electrical power obtained through the conversion by the solar panel and then by the boost section, and to charge the high voltage battery with the boosted electrical power in multiple stages.

2. The vehicle-mounted power source apparatus according to claim 1, further comprising a second low voltage battery that supplies stored electrical power to a load in a vehicle equipped with the vehicle-mounted power source apparatus, wherein, when the amount of electrical power stored in the second low voltage battery is equal to or greater than a predetermined value, the control section makes a control so as to charge the low voltage battery with the electrical power transformed by the bidirectional buck-boost section.

3. The vehicle-mounted power source apparatus according to claim 1, further comprising a second low voltage battery that supplies stored electrical power to a load in a vehicle equipped with the vehicle-mounted power source apparatus, wherein, when the amount of electrical power stored in the high voltage battery is equal to or greater than a predetermined value, the control section makes a control so as to charge the second low voltage battery with the electrical power transformed by the bidirectional buck-boost section.

4. The vehicle-mounted power source apparatus according to claim 1, wherein the bidirectional buck-boost section is a maximum power point tracking apparatus.

* * * * *